United States Patent [19]

Zimmermann et al.

[11] 3,989,308
[45] Nov. 2, 1976

[54] WEIGHING APPARATUS FOR PNEUMATIC CONVEYING INSTALLATIONS

[75] Inventors: Adolf Zimmermann; Otmar Link; Josef Theierl, all of Osterburken, Germany

[73] Assignee: AZO-Maschinenfabrik Adolf Zimmermann, Germany

[22] Filed: Nov. 26, 1974

[21] Appl. No.: 527,228

[30] Foreign Application Priority Data

Dec. 8, 1973 Germany............................ 2361279

[52] U.S. Cl. .................................. 302/3; 222/145; 222/504; 302/27
[51] Int. Cl.² ........................................ B65G 53/24
[58] Field of Search .............. 222/145, 504; 302/21, 302/27, 3; 137/606

[56] References Cited
UNITED STATES PATENTS

| | | |
|---|---|---|
| 2,874,999 | 2/1959 | Löfgren .............................. 302/27 |
| 3,104,030 | 9/1963 | Howlett......................... 222/504 UX |

*Primary Examiner*—Robert B. Reeves
*Assistant Examiner*—John P. Shannon
*Attorney, Agent, or Firm*—Craig & Antonelli

[57] ABSTRACT

In apparatus for weighing powdered material conveyed by suction from two or more supply containers to a single weighing and separating container via individual conduits with respective shutoff valves, the said valves are directly adjacent one another near the weighing container and in a common block to which are connected the said individual conduits and a common outlet conduit leading to the weighing container. For controlling the dosaging, an air supply valve and a secondary air valve may be provided on the valve block upstream of the shutoff valves. The respective valves may be driven by compressed-air cylinders controlled by switches associated with the weighing balance.

6 Claims, 3 Drawing Figures

WEIGHING APPARATUS FOR PNEUMATIC CONVEYING INSTALLATIONS

The invention relates to a weighing apparatus wherein powdered material for weighing is adapted to be conveyed from two or more supply containers with a suction method into a single weighing container with separator, and wherein shutoff valves are arranged in the component conduits between the supply containers and the weighing container at a spacing from the weighing container which forms paths of flow of equal length between themselves and the weighing container.

In pneumatic conveying installations in the foodstuffs industry, plastics material industry etc. it is known to insert a weighing apparatus directly in the path of conveyance, and the balance itself is arranged on a separating container. If the weighing apparatus is connected only to a single supply container, weighing usually does not present any problems. But if the weighing apparatus is connected to several supply containers which contain the same or different materials, when the desired weight is reached pneumatic conveying should per se be interrupted at once. If the conveyance flow were interrupted by immediate closing of the shutoff valves, the material situated at this instant in the conduit is left lying with the result that when the conveying installation starts again there are difficulties, or in other words the material left lying may become mixed with the next components to be conveyed. For this reason deficit or secondary air is introduced into the closed conveying conduit so that the material still situated therein, the so-called afterflow material, will also pass into the weighing container.

In a known installation (German laid-open specification No. 2,034,983), if several supply containers are connected to a weighing apparatus, it is proposed that the shutoff valves are arranged in the individual component conduits at such a spacing from the weighing container that all the components have the same paths of flow to the weighing container when the shutoff valves are closed. This ensures that in the case of each individual component there is the same afterflow quantity and to this extent therefore no irregularities can occur when weighing the individual components. It is a disadvantage in that installation that the shutoff valves are arranged at a relatively considerable spacing from the weighing container in each individual component conduit. This involves a relatively considerable constructional outlay. The place where the shutoff valves are arranged must also be precisely located. Conversion of the installation is only possible with some difficulty.

The invention has as its object to develop further the aforesaid weighing apparatus and more particularly to provide a possibility of also connecting further supply containers subsequently to existing installations, and allowing existing installations to be converted or re-arranged without difficulty.

This object is achieved in that the shutoff valves of all the component conduits are arranged in a common block directly adjacent one another, and to this block there are connected on the one hand the component conduits leading to the valve and on the other hand a common outlet conduit leading to the weighing container.

By arranging the valves close together it is still ensured that the afterflow quantity is the same for all the components. The shutoff valves can be assembled in a simple manner to form the valve block in a unit construction system. If further supply containers are to be connected to the weighing container, it is not difficult to flange-connect a suitable component conduit to the valve block and there is no need for this purpose to make any modification in the existing installation or even requiring welding work. Furthermore the valves are easy to maintain since they are arranged in a concentric and easily supervised manner, and operation disturbances can easily be detected and eliminated. Re-arrangement is also easily possible since all that this requires is to lay the conduits in a different way or modify the arrangement whilst the entire valve assembly remains unaltered.

According to a particularly advantageous constructional form of the invention an air supply valve is arranged on the valve block upstream of the first shutoff valve in the direction of flow. This air supply valve is opened as soon as the shutoff valve of the component which has just been conveyed into the weighing container has been closed, so that the afterflow material still passes into the weighing container. The arrangement of the air supply valve is such that the air entering there can flow past all the other shutoff valves. In this way an improvement is obtained as compared with the state of the art since in the state of the art each shutoff valve must have an air supply valve associated with it, whereas in this case one air supply valve is sufficient for substantially any member of shutoff valves.

A further deficit air valve, used for fine dosaging, can also be arranged between the air supply valve and the shutoff valves. Since when the installation is running at its full output the weighing container fills rapidly and there is a risk that the desired weight will be exceeded, before the desired weight is reached the secondary air valve is opened with the result that the quantity conveyed per unit of time rapidly drops and thus fine dosaging is possible up to the attainment of the desired weight, and it is only when this happens that the air supply valve is opened.

Accordingly to a further feature of the invention the shutoff valves, the air supply valve and the secondary air valve are operated by means of compressed-air cylinders of the secondary air valve used for fine dosaging to be controlled by a critical valve switch which is arranged at the balance and which responds shortly before the attainment of the desired weight. Thus the deficit air valve can be opened automatically shortly before the desired weight is reached. It is also possible for the air supply valve to be capable of being controlled by a limit switch which is also arranged on the balance and which responds when the desired weight is reached. Thus as soon as the quantity conveyed into the weighing container comes into the desired weight range, first of all the secondary air valve is opened and after the desired weight is reached, the air supply valve. This makes it possible to weigh several components automatically by means of a weighing apparatus.

A constructional form of the invention shown in the drawings will be described hereinafter. In the drawings.

Figure 1:
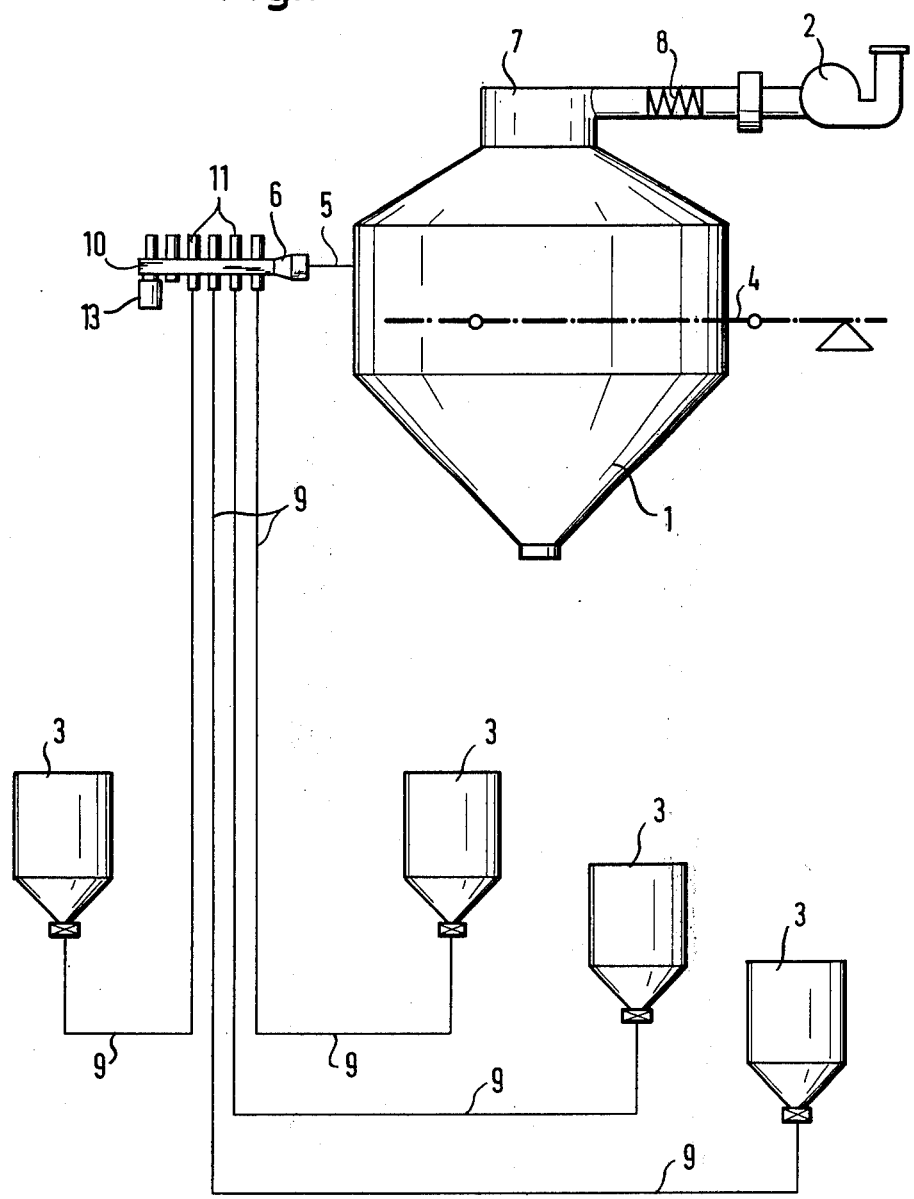
FIG. 1 shows a view in diagrammatic manner of a pneumatic conveying installation with weighing apparatus.

The weighing and separating container which is given the general reference numeral 1 is situated in a pneumatic suction stream produced for example by a suction fan 2. The conveying of material by suction is produced by the pump 2 between a plurality of supply containers 3, four containers in the constructional example shown, which containers can be located at different places, and the weighing and separating container 1.

The weighing and separating container 1 comprises a balance 4, for example a beam balance. The inlet conduit 5 entering the container and the outlet conduit 7 are each arranged in a horizontal manner. Also arranged in these conduits are surge compensating means 6, 8 in order to keep the balance 4 free of external forces.

Shutoff valves 11 are arranged near the weighing and separating container in the component conduits 9 between the supply containers 3 and the weighing and separating container 1. These shutoff valves 11 are assembled to form a block to which there are connected on the one hand the component conduits 9 and which on the other hand is flange-connected directly to the inlet conduit 5 and surge compensating means 6.

Figure 2:
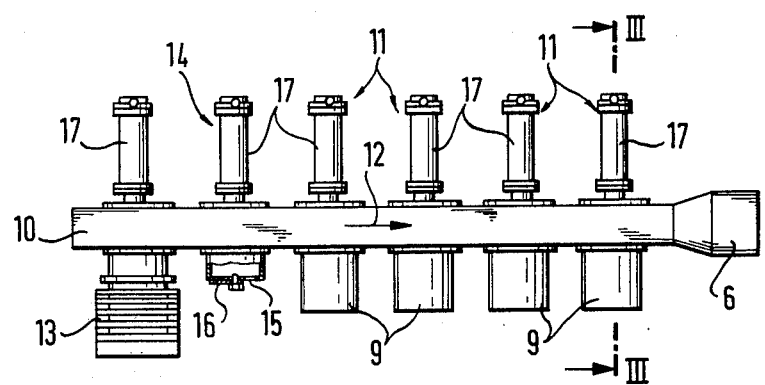
FIG. 2 shows a side view of the valve block.
Figure 3:
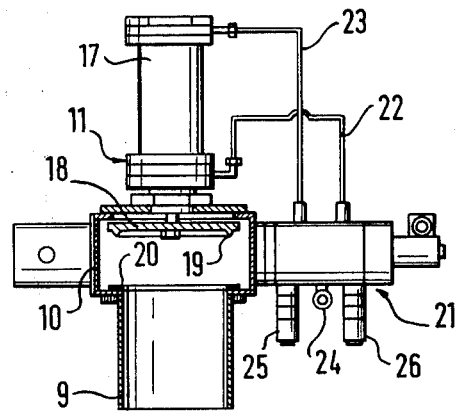
FIG. 3 shows a section through an individual valve according to III—III in FIG. 2.

The valve block 10 is shown in more detail in FIG. 2 and 3. The individual shutoff valves 11 are arranged immediately adjacent one another on the unit construction principle on the valve block. The material passes through the component conduits 9 into the valve block, is made to change direction through 90° therein, and flows in the direction of the arrow 12 by way of the surge compensating means 6 and the inlet conduit 5 into the weighing and separating container 1. Upstream of the first valve in the direction of flow, or at the side of the valve block remote from the weighing and separating container, there is arranged an air supply valve 13. Thus the air introduced to this valve flows past all the shutoff valves 9. A secondary air valve 14 for fine dosaging is also interposed between the air supply valve 13 and the first shutoff valve 11. This comprises an aperture with a fixedly set cross-section. But this cross-section can be adjusted by more or less considerably masking by means of a disc 16, so that the proportion of secondary air can be varied. Very fine dosaging is possible with the largest aperture cross-section and the coarsest dosaging with the smallest aperture cross-section, whereas the air supply valve 13 is used for allowing the afterflow also to be conveyed into the weighing and separating container when the shutoff valve 11 is closed.

Both the shutoff valve 11 and also the air supply valve 13 and the secondary air valve 14 are driven by compressed-air cylinders 17, as FIG. 3 shows in more detail. Each valve 11 comprises a disc 18 which comprises an annular bead 19 at one face. The valve disc 18 is arranged on the double-acting piston (not shown) of the compressed-air cylinder 17. The component conduit 9 in the region where it opens into the valve block 10 is surrounded by an elastic sealing ring 20. In the closed state, the annular bead 19 of the valve disc 18 presses into the sealing ring 20.

FIG. 3 also indicates the compressed-air connection 21 for each shutoff valve 11. By means of a central connecting conduit 24 and two magnetically operated valves 25, 26 the air under pressure enters either one or other pressure conduits 22, 23, these being connected each to a respective cylinder chamber of the compressed-air cylinder 17.

The same arrangement as is shown by way of example in FIG. 3 for a shutoff valve 11 is also provided for the air supply valve 13 and the secondary air valve 14 used for fine dosaging (see FIG. 2). The secondary air valve 14 is in this case controlled into the open position when the actual weight in the weighing and separating container corresponds approximately to the desired weight. Owing to the deficit air flowing in through the aperture 15 the quantity conveyed drops so that the container is then filled more slowly, until finally the desired weight is reached. Then by means of a limit switch adjusted thereto the magnetically operated valve controlling the corresponding shutoff valve and the magnetically operated valve opening the air supply valve 13 are operated.

What is claimed is:

1. Weighing apparatus wherein various components to be weighed, which are in powder form, are adapted to be conveyed from two or more supply containers with a suction method into a single weighing container with separator, and shutoff valves are provided in component conduits between the supply containers and the weighing container at a spacing from the weighing container which forms paths of flow of equal length between the shutoff valves and the weighing container, the shutoff valves of all the component conduits being arranged directly adjacent one another in a common block and near the weighing and separating container, to which there are connected on the one hand the component conduits which lead to the shutoff valves and on the other hand a common outlet conduit leading to the weighing container, wherein an air supply valve is arranged upstream of the shutoff valves and between the air supply valve and the shutoff valves there is arranged a secondary air valve for fine dosaging.

2. Weighing apparatus according to claim 1, wherein the shutoff valves, the air supply valve and the secondary air valve are driven by means of compressed-air cylinders.

3. Weighing apparatus according to claim 2, wherein the compressed-air cylinder of the deficit air valve is adapted to be controlled by a critical value switch which is arranged on a balance of the weighing and separating container and responds shortly before the desired weight is reached.

4. Weighing apparatus according to claim 2, wherein the compressed-air cylinder of the air supply valve is adapted to be controlled by a limit switch which is arranged on a balance of the weighing and separating container and which responds when the desired weight is reached.

5. Weighing apparatus according to claim 1 wherein the shutoff valves, the air supply valve and the secondary air valve are of identical construction to one another.

6. Weighing apparatus according to claim 5, wherein the valve block comprises a duct at one side of which the component conduits, the a secondary air conduit and an air supply conduit debouch and at the opposite side of which there are arranged valve discs closing the mouth openings of the conduits and associated with compressed-air cylinders.

* * * * *